(No Model.)
J. O. PEW.
FASTENING FOR METALLIC ROOFS.
No. 521,572. Patented June 19, 1894.
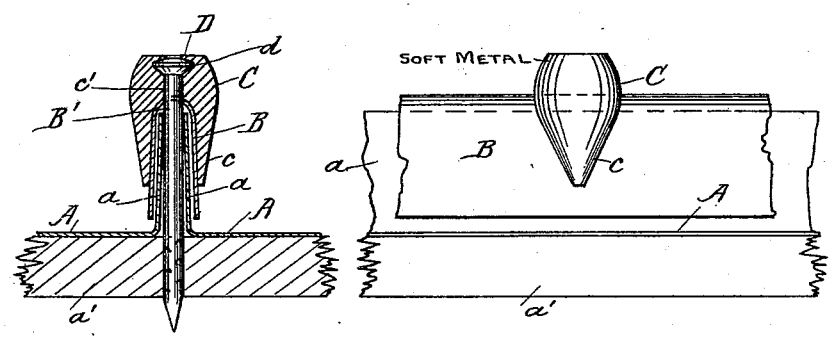
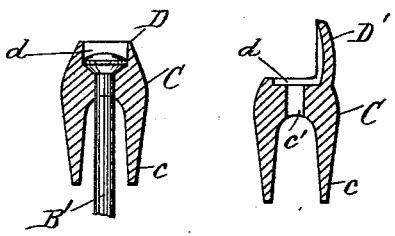
WITNESSES
INVENTOR
John O. Pew
by Herbert W. T. Jenner.
Attorney
THE NATIONAL LITHOGRAPHING COMPANY,
WASHINGTON, D. C.

UNITED STATES PATENT OFFICE.

JOHN OSBORN PEW, OF NORTH BLOOMFIELD, OHIO.

FASTENING FOR METALLIC ROOFS.

SPECIFICATION forming part of Letters Patent No. 521,572, dated June 19, 1894.

Application filed February 23, 1894. Serial No. 501,234. (No model.)

*To all whom it may concern:*

Be it known that I, JOHN OSBORN PEW, a citizen of the United States, residing at North Bloomfield, in the county of Trumbull and State of Ohio, have invented certain new and useful Improvements in Fastenings for Metallic Roofs, and I do hereby declare the following to be a full, clear, and exact description of the invention, such as will enable others skilled in the art to which it appertains to make and use the same.

This invention relates to fastening devices for metallic roofs; and it consists of the washer clip hereinafter fully described and claimed.

In the drawings: Figure 1 is a cross-section through the joint of a metallic roof showing the washer clip. Fig. 2 is a side view of the same. Fig. 3 is a detail sectional view through the washer clip before the projecting portion is hammered down. Fig. 4 is also a detail sectional view and shows a modification of the washer clip.

A A are ordinary metallic roofing plates provided with upturned flanges $a$; and B is an ordinary cap plate which is placed over the said flanges $a$.

B' is a nail which is driven through the center of the cap plate between the flanges $a$, into the ordinary wooden support $a'$ under the roofing plates.

A screw or any other kind of a nail provided with a head may be used as the equivalent of the nail shown in Fig. 1, but the preferred nail is a wire nail having barbs at its lower end.

C is the washer clip interposed between the head of the nail and the cap plate. The washer plate has a forked lower end $c$, which straddles the cap plate and prevents it from spreading, and is provided with a central hole $c'$. The washer clip is made of soft metal, such as lead or an alloy in which lead is the principal metal. The washer plate is provided with a recess $d$ for the head of the nail and a projecting portion D which extends above the head of the nail. The bottom of the recess $d$ is preferably countersunk, but when a screw is used the head of the screw may be relied on to form its own countersink at the bottom of the recess.

When the nail or screw is driven hard into the wood, its head forms a watertight joint with the soft metal washer clip. It also forces the soft metal hard against the top of the cap plate, and makes a watertight joint between the under side of the washer clip and the cap plate. After the nail or screw has been driven in, the projecting portion D is hammered over as shown in Fig. 1 to prevent water from penetrating around the head of the nail.

In the modification shown in Fig. 4, the washer clip is provided with a projecting flap D' upon one side, instead of a circular projecting portion as hereinbefore described.

What I claim is—

1. A washer clip of soft metal provided with a forked lower end adapted to straddle the cap plate, a central hole, and a projecting portion adapted to be hammered down over the head of the nail or screw when driven in, substantially as set forth.

2. A washer clip of soft metal provided with a forked lower end adapted to straddle the cap plate, a central hole, and a projecting flap upon one side of it, adapted to be hammered down over the head of the nail or screw when driven in, substantially as set forth.

In testimony whereof I affix my signature in presence of two witnesses.

JOHN OSBORN PEW.

Witnesses:
WILLIAM S. HARRIS,
WM. H. SMILEY.